Figure 4:
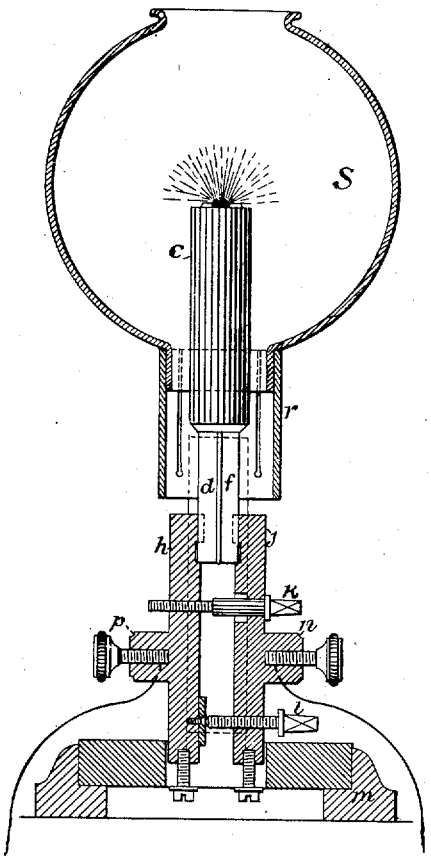

P. JABLOCHKOFF,

Assignor to THE JABLOCHKOFF ELECTRIC LIGHTING COMPANY.

ELECTRIC LAMP.

No. 9,935. Reissued Nov. 15, 1881.

WITNESSES:

Julian A. Hurdle.

Thos. Tommey

INVENTOR:

Paul Jablochkoff.

by R. C. Townsend

Attorney

THE NORRIS PETERS CO., PHOTO-LITHO., WASHINGTON, D. C.

UNITED STATES PATENT OFFICE.

PAUL JABLOCHKOFF, OF PARIS, FRANCE, ASSIGNOR TO THE JABLOCHKOFF ELECTRIC LIGHTING COMPANY, OF SAME PLACE.

ELECTRIC LAMP.

SPECIFICATION forming part of Reissued Letters Patent No. 9,935, dated November 15, 1881.

Original No. 190,864, dated May 15, 1877. Application for reissue filed September 27, 1881.

*To all whom it may concern:*

Be it known that I, PAUL JABLOCHKOFF, of Paris, France, have invented a new Electric Lamp, of which the following is a specification.

The object of my invention is the absolute suppression of the mechanical regulators heretofore employed in electric lamps. Instead of arranging the conductor sticks or carbons end to end and causing them to progress toward one another as they consume by mechanical devices, I fix them in a parallel position with relation to one another and at a short distance apart, and separate them by an isolating material fusible only at a high temperature, but which is capable of consumption at the same time with the carbons themselves under the action of the arc. The isolating material may either be a solid and compact substance—such as kaolin, glass, mortar, lacs, &c.—or it may be in the form of friable mixtures or powders, more or less fine, and composed of earthy substances, earthen alkali, silicious substances—in other words, substances that are highly refractory. The isolating or non-conducting material may surround one or both of the carbons or may be placed in the space between the carbons only. When the electric arc is formed between the ends of the carbons the isolating material at and near the arc is slowly melted or volatilized with the carbons themselves, and as it wastes or consumes slowly clears the carbons or conductors at their points, thus exposing fresh surface for the formation of the arc. To the function of the isolating material in preventing the formation of the arc at any point excepting at the exposed ends of the conductor pencils or carbons is added another effect due to the presence of the isolating material along the entire length of the stick or pencil, and to its simultaneous consumption therewith, viz: The isolating material, by reason of its volatilization and incandescence under the action of the arc, becomes also a source of light, and the lamp thus has over prior forms of lamp employing conductor sticks or pencils only, the advantage of producing a luminous source or flame of considerable extent instead of a single luminous point. As the isolating material is arranged in proximity to the carbon stick or pencil its whole length, this action continues so long as the carbons burn, and there is no necessity of supplying or feeding fresh quantities of the isolating substance. By mixing with the isolating substance a quantity of particles of graphite I obtain an extraordinarily brilliant effect. I may also change the color and shade of the light by introducing into the composition of the isolating substance a small quantity of metallic salts, such as are used in fire-works. Salts of soda, for instance, which produce yellow radiations, have the property of compensating for the blue and violet rays which the electric arc contains to excess. Instead of the solid carbons or pencils which are embedded in or separated by the isolating material I may employ hollow sticks or tubes formed of any conductive substance, such as metal or graphite, and filled with something similar to the isolating material—for instance, a paste or agglomeration composed of silicious or earthy substances with powdered carbonaceous matter. When the electric arc is formed there is a fusion both of the isolating matter between the hollow sticks and of the mixture which fills them.

Having thus described the general nature and results of my invention, I will now describe some of the many forms it may assume in practice.

Figure 1:
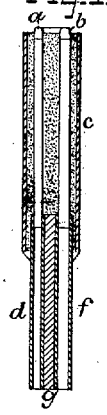
Figure 2:
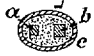
Figure 3:
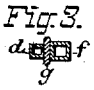
Figure 5:
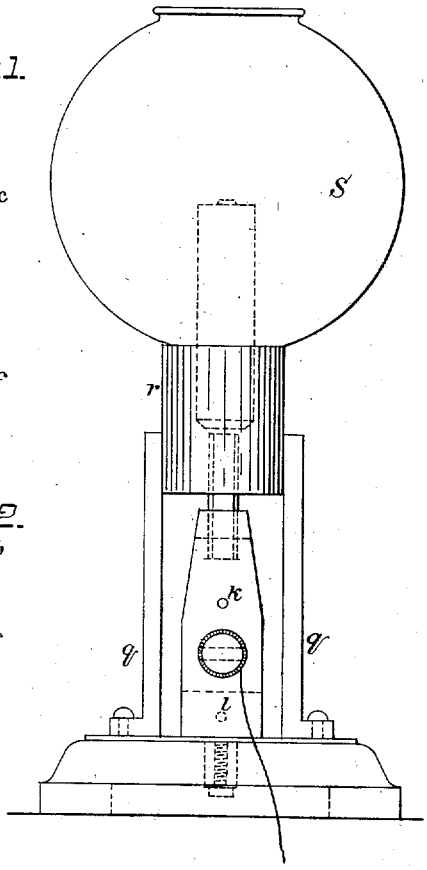

In the accompanying drawings, Figure 1 is a vertical section of a lamp in which the isolating and fusible material is in the form of powder. Fig. 2 is a transverse section on the line *x x* of Fig. 1. Fig. 3 is a transverse section on the line *y y* of Fig. 1, through the base of the carbon pencils, which at this point are sheathed with metal and separated by a strip of insulating material. Fig. 4 is a vertical section of a base and holder for the lamp, showing the candle in position for use. Fig. 5 is an elevation of the lamp. Figs. 6, 7, 8, and 9 are top views of modified forms of the candle.

Figure 6:
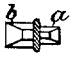
Figure 7:
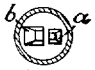
Figure 8:
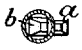
Figure 9:
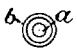

Referring to Figs. 1, 2, and 3, *a* and *b* are rods or pencils of carbon or analogous material, of prismatic form, pointed at their ends and of unequal sectional area, the largest being that which receives the positive current, and is consumed more rapidly than the other. These rods or pencils are placed parallel to each other, and in the present instance are surrounded by a case or cylinder, *c*, of paper or pasteboard of amianthus, which is employed for the purpose of holding in place the powdered mixture of isolating materials surrounding and separating the pencils, and which is consumed with them. One of these mixtures which I use to advantage is composed of lime, one part; of sand, four parts, and talc, two parts. These substances are well mixed together, in order to produce a homogeneous powder. The case, when filled with this powder up to the edges, is closed with a paste of silicate of potash. As to the other forms of the conductor pencils or carbons and other dispositions of the isolating material with relation thereto, a sufficiently-explicit idea is given by Figs. 6, 7, 8, and 9. In Fig. 9 the conducting rod or pencil *a* is inclosed in the hollow conducting-pencil *b*, and the isolating material is interposed in the annular space between them. In Fig. 6 the pencils are of the same form as in Fig. 1, and a strip of isolating material is interposed between them. In Fig. 7 the case is round instead of oval. In Fig. 8 one only of the pencils—viz., the larger, *b*—is surrounded with the isolating material. In these figures the isolating material is supposed to be a compact substance—as, for instance, kaolin—although the forms of Figs. 7, 8, and 9 are adapted for the employment of powders.

In order to facilitate the passage of the current to the pencils I inclose them at the inferior ends in sheaths of copper or other conducting metal, and between the pencils at this point I interpose a strip of isolating material. These sheaths also protect the pencils from fracture when they are clamped in their holder.

In Figs. 1 and 3 the conductor-pencils *a* and *b* are shown inclosed in sheaths of metal *d f* of copper, which are isolated from one another by a piece of card-board, (amianthus,) *g*.

The holder, which serves to support the candle and to conduct the current to the metal sheaths and the pencils, consists of two metal jaws, *h* and *j*, between which the lower end of the candle is placed and secured by means of the clamping-screws *k l*, acting upon the jaws. This holding device is made of copper or other conducting material, and is mounted upon a base, *m*, of wood or other isolating material. Binding-posts *p* and *n* upon the clamping-jaws serve for attachment of conducting-wires, which convey the electric current to the lamp.

Upon the base of the holder are mounted the angle-pieces *q*, to the upright portions of which is secured a ring, *r*, serving as a support for a globe, *s*, of opal glass or other translucent material. This globe is for the purpose of diminishing the dazzling effect of the light. I do not confine myself to this sort of holder, as it may be varied according to the light required.

To light the candle I may employ a piece of carbon fixed in an isolating handle. When the current is introduced the piece of carbon is placed upon the ends of the conducting-pencils, thus closing the circuit and lighting the lamp. When the lamp is lighted the piece of carbon is withdrawn. Under the action of the electric arc and the incandescent sticks or pencils, the isolating material, which is melted, fused, or volatilized, appears to furnish a conducting-path for the electric current passing between the sticks that is of considerably less resistance than the path afforded in the ordinary arc lamp. In consequence of the facility afforded for the passage of the current, I am able to subdivide the light and to place a large number of lamps upon the same circuit. I can thus divide into many luminous foci the strong light which in the arc lamps heretofore employed it was necessary to concentrate in a single electric arc.

In case several candles are placed on the same circuit, I can apply to the surface of each candle a pulverable priming, so that all the lamps can be lighted together, by simply turning a button controlling the flow of the electric current to the circuit.

What I claim as my invention is—

1. An electric-arc lamp consisting of parallel conductors separated by an isolating material capable of consumption by the action of the electric arc, substantially as described.

2. An electric-arc lamp consisting of parallel conductor sticks or pencils and a mass of refractory combustible or fusible material, substantially such as described, applied to said rods or pencils along their length, so as to be consumed with them, and to add by its incandescence and volatilization to the size of the luminous source.

3. The combination, with two parallel conductor sticks or pencils, of a surrounding mass of isolating material surrounding and separating the same their whole combustible length, so as to be consumed simultaneously therewith.

4. The herein-described electric candle, composed of two sticks of carbon, arranged in a suitable case, and separated from each other and from the case by an isolating fusible powder or material, substantially as described.

5. In combination with two parallel conductor sticks or carbons, conducting-sheaths of copper or other good conducting material at their inferior ends, and a strip of isolating material interposed between the sheaths, substantially as described.

6. The combination, with an electric-arc lamp or candle consisting, essentially, of parallel sticks or pencils, of a two-part conducting-clamp constructed to embrace the pencils and a non-conducting strip interposed between the carbons at or near the clamping-point, substantially as described.

7. The combination, with two parallel conductor sticks or pencils, of a mass of isolating material, substantially such as described, containing particles of graphite, and applied to said sticks or pencils their entire combustible length, so as to be consumed simultaneously with them.

8. The combination, with two parallel conductor sticks or pencils, of a mass of isolating material, substantially such as described, containing metallic salts, and applied to said sticks or pencils their entire combustible length, so as to be consumed simultaneously with them.

PAUL JABLOCHKOFF.

Witnesses:

A. POLLOK,

ARMENGAU, Jeune.